(12) United States Patent
Samodell

(10) Patent No.: US 7,109,437 B2
(45) Date of Patent: Sep. 19, 2006

(54) ELECTRIC ARC WELDER WITH BACKGROUND CURRENT

(75) Inventor: Ralph M. Samodell, Willoughby Hills, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 264 days.

(21) Appl. No.: 10/726,810

(22) Filed: Dec. 4, 2003

(65) Prior Publication Data

US 2005/0121430 A1    Jun. 9, 2005

(51) Int. Cl.
*B23K 9/10* (2006.01)

(52) U.S. Cl. .................................. 219/130.1

(58) Field of Classification Search ............ 219/130.1, 219/130.31, 130.32, 130.33, 130.51
See application file for complete search history.

(56) References Cited

U.S. PATENT DOCUMENTS

| 3,665,149 | A | * | 5/1972 | Sakabe et al. ......... 219/130.51 |
| 6,384,373 | B1 | | 5/2002 | Schwartz |
| 6,388,232 | B1 | | 5/2002 | Samodell |
| 6,504,738 | B1 | * | 1/2003 | Schwartz et al. ...... 219/130.33 |

\* cited by examiner

*Primary Examiner*—Clifford C. Shaw
(74) *Attorney, Agent, or Firm*—Fay, Sharpe, Fagan, Minnich & McKee, LLP

(57) ABSTRACT

An electric arc welder comprising a power source driven by a main input transformer with a secondary winding creating an output pulsating current across the electrode and workpiece of a welding operation is provided with a background current circuit including a full-wave rectifier with AC input and a rectified DC output connected in parallel with the power source across the welding operation wherein the full-wave rectifier is connected in parallel with the secondary winding.

47 Claims, 7 Drawing Sheets

(DC CONNECTION)

IMBALANCED BACKGROUND AC OCV

IMBALANCED BACKGROUND AC MIN, WELD LOAD

ELECTRIC ARC WELDER WITH BACKGROUND CURRENT

The present invention relates to an electric arc welder and more particularly to an electric arc welder with a background current circuit for use during low current welding, especially for TIG welding of thin metals.

INCORPORATION BY REFERENCE

The present invention is an improvement over the low current power source shown in Samodell U.S. Pat. No. 6,388,232, wherein a supplemental power supply including a full-wave rectifier is used to produce a low current for TIG welding. A low current switch activates the supplemental power supply, which power supply is separately driven by its own input transformer. A similar concept using a supplemental power source is shown in Schwartz U.S. Pat. No. 6,384,373. Each of these patented electric arc welders uses a supplemental power supply for a power source comprising a gated bridge, similar to the power source of the present invention. Consequently, these patents are incorporated by reference herein as background information on the general power source to which the present invention is directed. Schwartz U.S. Pat. No. 6,384,373 has a full time supplemental power supply; but, does not explain the purpose of this power supply except it is driven by a separate winding. Samodell U.S. Pat. No. 6,388,232 utilizes the supplemental power supply for low amperage operation, which operation is more attuned to the purpose of the present invention. Neither of these patents provide background current for AC welding as well as DC welding using only the main power supply.

BACKGROUND OF INVENTION

For welding, either AC or DC, with a gated bridge, such as an SCR bridge as shown in Samodell U.S. Pat. No. 6,388,232, it is difficult to weld at very low currents, i.e. of less than about 8.0 amperes. At low currents, the individual SCR switches of the gated bridge are phased back to produce a series low current pulses, which pulses are smoothed out by a DC choke. However, at low amperes, the arc is unstable and tends to be extinguished. To solve this dilemma, The Lincoln Electric Company of Cleveland, Ohio developed its Microstart welder, shown generally in Samodell U.S. Pat. No. 6,388,232. This patented power source incorporates a supplemental power supply which is initiated during low current welding. Lincoln's electric arc welder has experienced substantial commercial success; however, due to the additional components and accessories, the welder is somewhat expensive. In some instances, the added expense of the welder is not justified by the particular welding application. Thus, customers often purchased electric arc welders not having the unique low current abilities of the Microstart welder. In the prior units, at open circuit voltage(OCV) the supplemental power supply would have current flow causing high power dissipation. Consequently, there is a commercial need for a low cost electric arc welder of the type using a gated bridge type power source which can operate at low currents, i.e. less than about 8.0 amperes and, indeed, less than 3.0 amperes. Also, the power source should be such there is minimal power dissipation during open circuit voltage when there is no power directed to the arc. As disclosed in Schwartz U.S. Pat. No. 6,384,373 prior units employing separate, supplemental power supplies require a filter including a capacitor or inductor. It is desirable to avoid the high cost of these filter components. These prior arc welders used large output chokes so low level operation caused the arc performance to be erratic and difficult to control. Low current welding used a separate or supplemental power supply superimposed on the output circuit of the main welder power source. In this manner, background current was used to replace the main current. The background current did not merely augment the SCR current. This operation was difficult to control. All of these disadvantages of prior gated bridge type power sources for use in AC and DC electric arc welders are overcome by the present invention.

SUMMARY OF INVENTION

The present invention involves an improvement that provides a background current using a circuit that is simple, effective and low cost. It does not need a separate power supply. The invention uses the main input transformer, together with background current resistors and diodes to bypass the SCR switches in a full-wave gated bridge power source with two pairs of opposite polarity SCR switches. Consequently, the background welding current is supplied when the appropriate pair of SCR switches are not yet gated to the conductive state for the phase controlled output current. Both the gated full-wave bridge and the low background current are supplied by the secondary winding of the main transformer. This greatly simplifies the electric arc welder, even though it still produces a background current in a unique manner. The background current fills in between the main SCR conduction current pulses. The main transformer secondary provides the background current through a resistor and a diode parallel to each SCR of the bridge. This background current circuit bypasses all of the main SCR switches when operating. Consequently, there is no separate or supplemental power supply. By using the present invention, the main power source provides the background current for either AC welding or DC welding by current following the waveform of the input current to the gated bridge. Since the conduction of the main SCR switches shunts the background resistors, power dissipation by these resistors is reduced when there is increased conduction time of the main SCR switches. Consequently, lost resistor power is minimal during maximum open circuit voltage of the power source. The background current is controlled by a resistance which is determined by resistors each having, in the preferred embodiment, a value in the range of 10–15 ohms. Preferably, each resistor has a value of 12 ohms. The total resistance of the background current resistors is generally 20–30 ohms and preferably about 24 ohms. The level of resistance is divided between resistors at the input and output of the full-wave rectifier used in practicing the present invention. The value of the reactance or individual resistance is selected to provide adequate background current and arc voltage to experience minimal power dissipation. The resistors will be changed for different weld circuits.

In accordance with an aspect of the invention, a filter capacitor is added to the full-wave background current bridge and the background current resistance is obtained by using more than one resistor, which resistors total about 24–25 ohms. Some resistance is in the AC path of the full-wave rectifier and is used to limit the capacitor inrush current. This results in a continuous DC background current wave shape that is less affected by even lower level arc conditions.

In another aspect of the invention, the background current from the full-wave rectifier is not balanced. To accomplish this feature, the background current resistors are separated so that the AC current during the positive half wave cycle of the main welding secondary is more or less than the AC current during the negative half wave cycle. Consequently, a background current level is different for every half cycle during either AC or DC welding. In this manner, the background current creates cleaning or penetration effect during low current welding. This is beneficial for welding very thin metals, such as aluminum. As is known, during low current operation of an SCR gated bridge it is normally not possible to produce imbalance. By using the present invention and merely selecting the background current resistors that are applicable during the half cycles, imbalance is obtained, even at the low current operation. Thus, the invention not only provides low current operation for a gated bridge power source, but also allows low current imbalance efffects for thin metals, such as aluminum. This is accomplished by selecting the background current resistors to be different for the positive and negative half cycles. This feature can not be done using the two electric arc welders in the patents incorporated by reference herein.

In accordance with the present invention, there is provided an electric arc welder comprising a gated full-wave bridge driven by the secondary of an input transformer, with an output connected across the electrode and workpiece of a welding operation through a DC choke. There is provided a background current circuit including a full-wave rectifier with an AC input and a rectified DC output and a current controlling resistance caused by resistors. This background current circuit is connected in series with the welding operation and the DC choke. When used for DC welding the rectifier is connected directly to the AC nodes of the gated bridge. For AC operation, the rectifier is still connected to the AC node, but in series with the welding operation, as is the SCR bridge. In accordance with the invention, the input of the full-wave rectifier is connected in parallel with the secondary winding of the main transformer that drives the gated bridge. For AC welding the electrode and workpiece is in series with the rectifier. In this manner, a low current is always available and has a value determined by the current of the secondary winding and the resistance selected in the background current circuit for either DC or AC welding. This background current circuit resistance has a level in the general range of 20–30 ohms and preferably about 24–25 ohms for 5 ampere/13 volts welding arc. The resistance is different between the positive and negative half cycles to provide both positive and negative SCR bypass current paths, when the gated bridge is used for AC welding. In another aspect, the background current is somewhat out of balance using separate bypass resistors for the purposes of affecting cleaning or penetration in low current weld mode for a TIG welder.

The primary object of the present invention is the provision of an electric arc welder that provides both DC and AC background current for a welder that does not require a separate supplemental power supply and is therefore more simple and less expensive.

Still a further object of the present invention is the provision of an electric arc welder, as defined above, which electric arc welder drives the background current circuit from the same transformer winding as the one used for the gated bridge power source.

Yet another object of the present invention is the provision of an electric arc welder, as defined above, where each SCR or gated switch of the power source bridge is paralleled by a diode and resistance receiving current from the main transformer secondary.

These and other objects and advantages will become apparent when considering the following description.

PREFERRED EMBODIMENT

Figure 1:
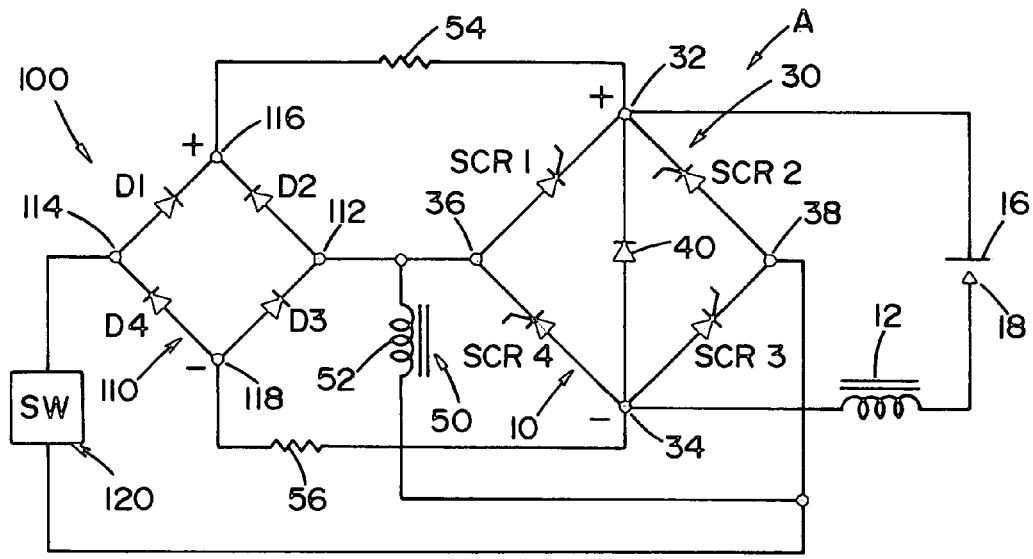
FIG. 1 is a schematic wiring diagram showing the present invention connected for DC welding.
Figure 2:
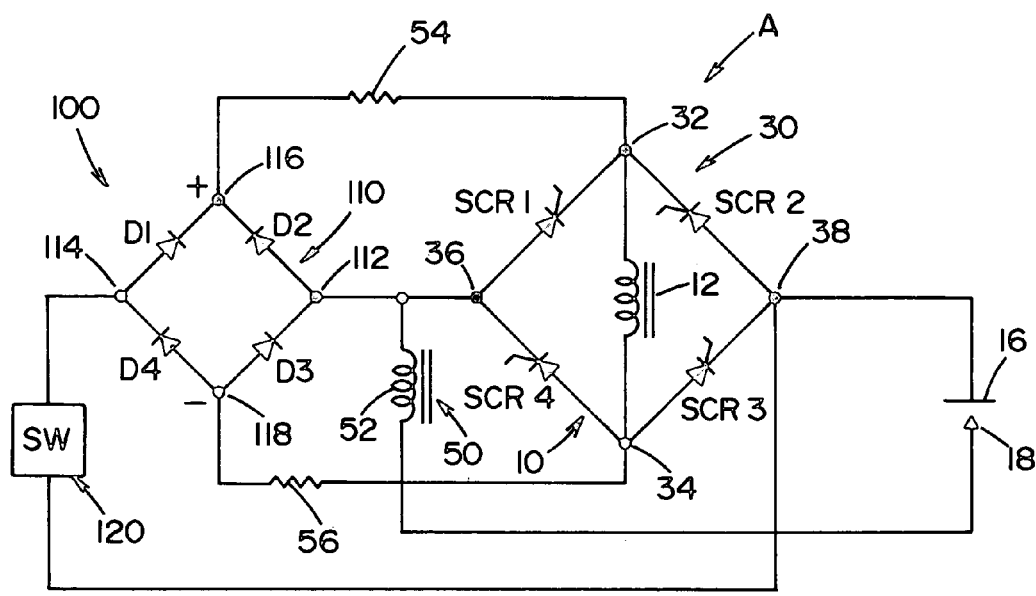
FIG. 2 is a schematic wiring diagram showing the present invention connected for AC welding.

Referring now to the drawings wherein the showings are for the purpose of illustrating a preferred embodiment of the invention only and not for the purpose of limiting sane, FIGS. 1 and 2 disclose schematically an electric arc welder A constructed in accordance with the present invention for DC welding and AC welding, respectively. The power source of the welder A is a standard gated bridge power source 10 for performing a welding operation across workpiece 16 and electrode 18. Current is directed across workpiece 16 and electrode 18 through a DC choke 12. In accordance with standard welding technology, bridge 30 includes DC output terminals 32, 34 and AC input terminals 36, 38 and is shown connected for a DC welding operation in FIG. 1 with free wheeling diode 40. In FIG. 2 power source 10 is connected for AC operation with DC choke 12 between nodes 32, 34. During positive half cycles, gated switches SCR 1, SCR 3 are conductive. In a like manner, gated switches SCR 2, SCR 4 are conductive during the input negative half cycle. The adjusted phase of the switches determines the current used in the DC or AC welding operation. As the gate signal is delayed, a lesser output current is directed through choke 12. This is standard power source technology as disclosed in several patents, such as Schwartz U.S. Pat. No. 6,384,373. An AC current is applied across terminals 36, 38 by transformer 50 having a secondary 52 for providing input current to bridge 30. This is a direct connection in FIG. 1. In FIG. 2 it is a connection in series with the welding operation. The output magnitude of the bridge is determined by the phase angle of the gating signals for the gated switches SCR 1, SCR 2, SCR 3 and SCR 4. The primary of transformer 50 is not illustrated, but is standard. As so far explained, welder A is state of the art and is primarily applicable for higher currents. When the currents are reduced by phasing back the gated switches, the arc becomes erratic and hard to control during either the AC or DC welding operation. The present invention relates to an improved welder wherein secondary 52 is used to generate a background current that is operative when the gated switches of bridge 30 are not conducting. At other times, the gated switches are conductive and shunt the background current circuit to reduce losses by this circuit.

In accordance with the invention, background current circuit 100 is connected in parallel with secondary 52. In FIG. 1 the circuit is directly in parallel. In FIG. 2 it is in series with node 38 and the welding operation. There is no separate power supply or supplemental power supply. The secondary operates circuit 100 which includes a full-wave rectifier 110 formed by diodes D1, D2, D3 and D4. Rectifier 110 has standard AC inputs 112, 114 and standard DC outputs 116, 118. Switch 120 connects rectifier 110 in parallel with secondary winding 52 when welder AC output is turned on. Resistors 54, 56 connect rectifier 110 to the DC outputs 32, 34 of the gated bridge. In this manner, a resistor and a diode (D1–D4) are in parallel with each switch SCR 1–SCR 4 so rectifier 110 supplies background current when the corresponding switch of power source 10 is not conducting. Thus, current from rectifier 110 driven by the same secondary as bridge 30 fills in between current pulses.

Figure 3:
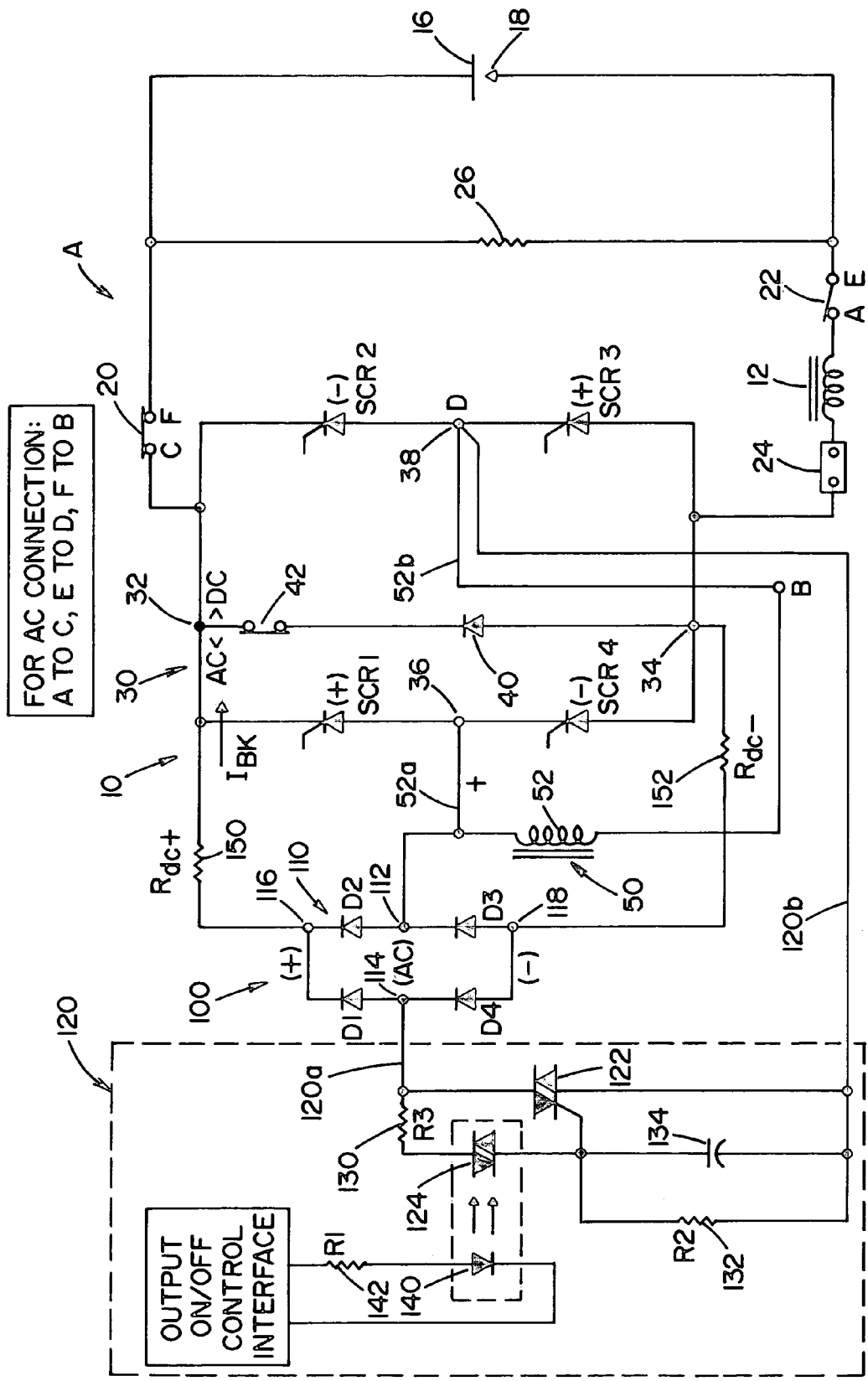
FIG. 3 is a wiring diagram of the preferred embodiment of the present invention connected for DC welding.
Figure 6:
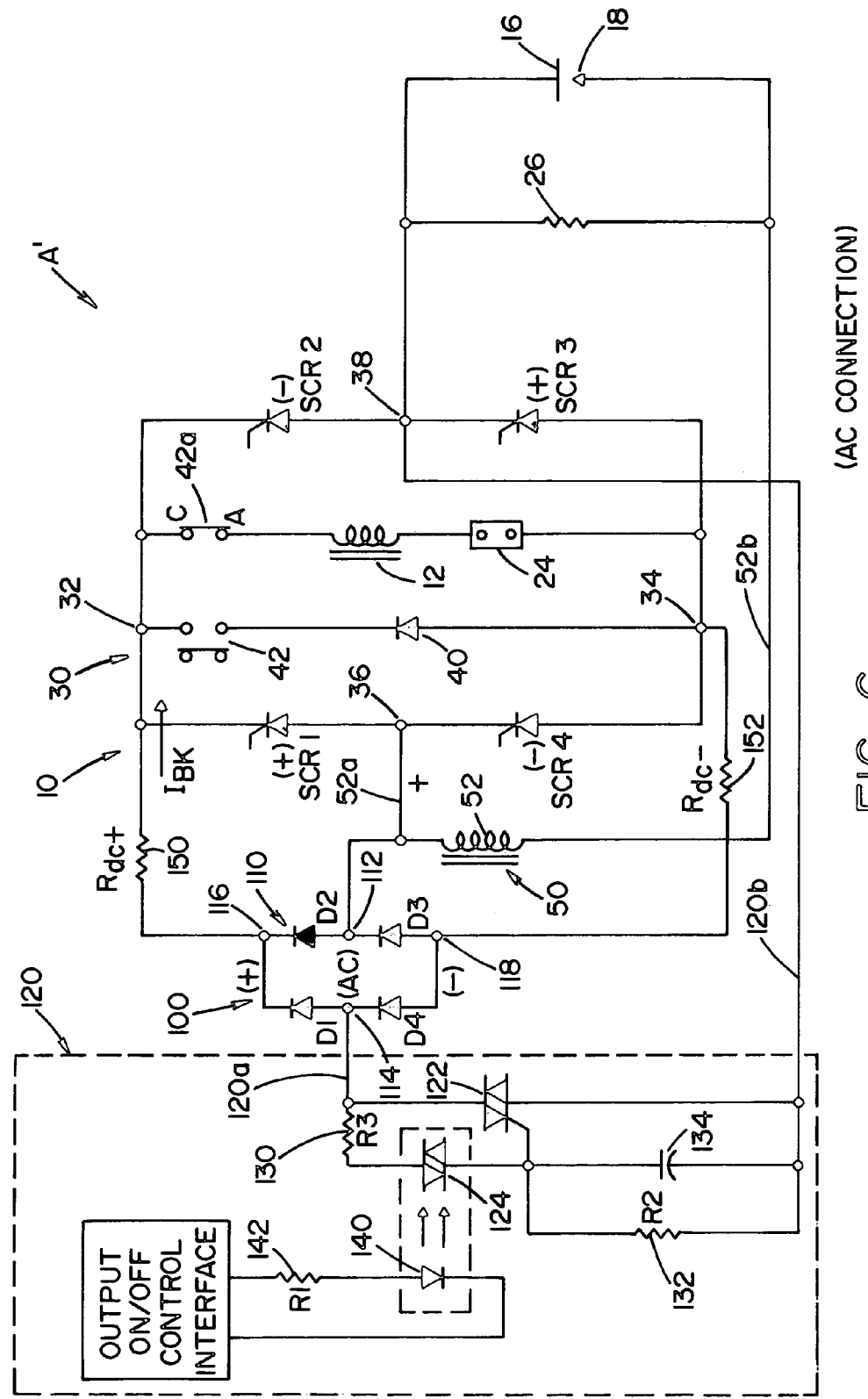
FIG. 6 is a wiring diagram of the preferred embodiment of the present invention connected for AC welding.

Welder A is a standard gated bridge power source 10 for performing a welding operation across workpiece 16 and electrode 18. Use of welder A for DC welding is shown in its practical implementation in FIG. 3. Current is directed across workpiece 16 and electrode 18 through a DC choke 12. Polarity switches 20, 22 are used to convert the gated bridge power source 10 from a DC output as shown in the figures to an AC welding output by making the connections indicated at the top of FIG. 3. In accordance with standard welding technology, welder A has shunt 24 for sensing the arc current and a holding resistor 26. Bridge 30 includes DC output terminals 32, 34 and AC input terminals 36, 38 and is shown connected for a DC welding operation. During positive half cycles, gated switches SCR 1, SCR 3 are conductive. In a like manner, gated switches SCR 2, SCR 4 are conductive during the input negative half cycle. The adjusted phase of the switches determines the current used in the welding operation. As the gate signal is delayed, a lesser output current is directed through choke 12. Freewheeling diode 40 is used in the DC operation of bridge 30 when switch 42 is closed. During the AC operation, switch 42 is opened and the DC freewheeling diode 40 is disconnected. The welder is connected as shown in FIG. 6. This is standard power source technology as disclosed in several patents, such as Schwartz U.S. Pat. No. 6,384,373. An AC current is applied across terminals 36,38 by transformer 50 having a secondary 52 for providing input current to bridge 30. Secondary 52 is connected between AC inputs 36, 38 by lines 52a, 52b, respectively. The output magnitude of the bridge is determined by the phase angle of the gating signals for the gated switches SCR 1, SCR 2, SCR 3 and SCR 4. The primary of transformer 50 is not illustrated, but is standard. As so far explained, welder A is state of the art and is primarily applicable for higher currents. When the currents are reduced by phasing back the gated switches, the arc becomes erratic and hard to control during either the AC or DC welding operation. The present invention relates to an improved welder wherein secondary 52 is used to generate a background voltage and current that is operative when the gated switches are not conducting. At other times, the gated switches are conductive and each shunt a diode and resistor pair of the background current circuit to reduce losses by this circuit.

Figure 4:
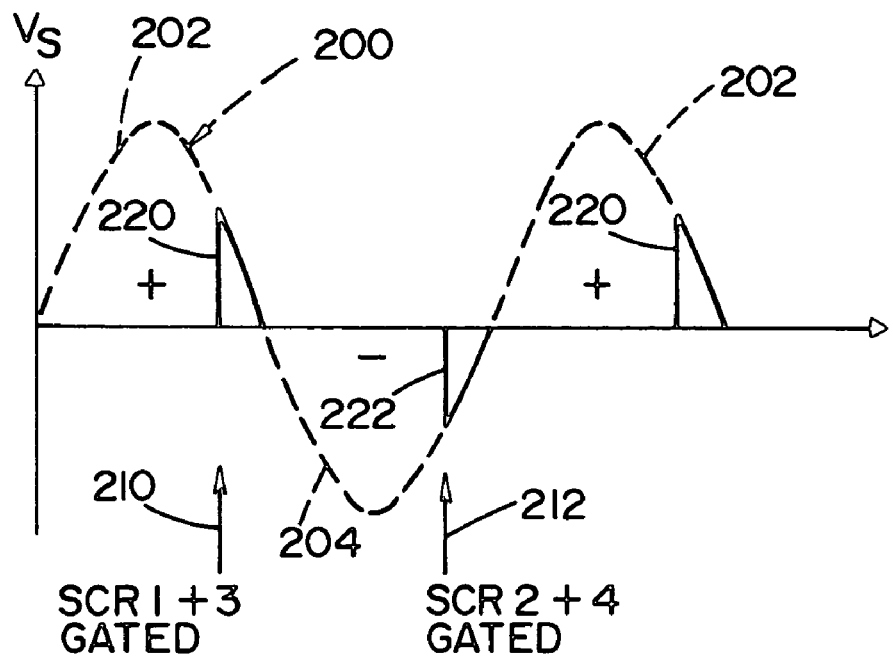
FIG. 4 is a voltage graph showing secondary voltage pulses created by the power source of the present invention when the switches are phased back for low current welding.
Figure 5:
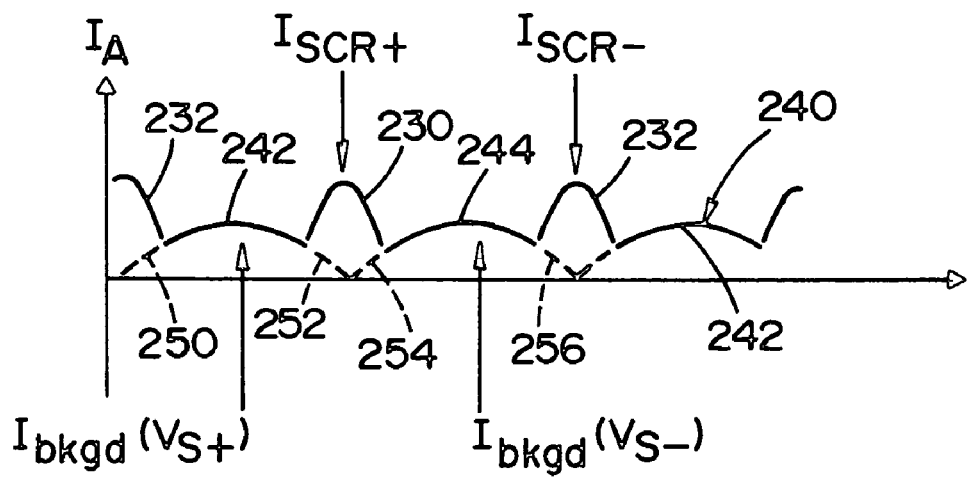
FIG. 5 is a current graph similar to the voltage graph in FIG. 4 illustrating the use of the present invention at low DC output current welding caused by the voltage spikes shown in FIG. 4.

In accordance with the invention, background current circuit 100 is connected in parallel with secondary 52. There is a direct connection by lines 52a, 52b. There is no separate power supply or supplemental power source. The secondary operates circuit 100 which includes a full-wave rectifier 110 formed by diodes D1, D2, D3 and D4. Rectifier 110 has standard AC inputs 112, 114 and standard DC outputs 116, 118. Switch 120 connects rectifier 110 in parallel with secondary winding 52 when the welder is turned on. Circuit 100 provides current to DC nodes 32, 34 of bridge 30. If the switches are conductive circuit 110 is not active. However, during times of non conduction, which are substantial at low currents, such as less than 5.0 amperes, there is substantial time of switch non conduction. The connection is by lines 120a, 120b. In the illustrated embodiment, switch 120 is a TRIAC network having TRIAC 122 gated by photo-TRIAC 124 and resistors 130, 132 with noise filter capacitor 134. LED 140 is energized through resistor 142. Activation of switch 120 is accomplished by energizing LED 140 to allow AC current to flow through resistors 130, 132 for actuating TRIAC 132. The connection between LED 140 and TRIAC 124 is optical because TRIAC 124 is light sensitive. When welder A output is turned off, TRIAC 124 is not energized and TRIAC 122 is deactivated. Circuit 100 produces an alternating background current that is a full wave rectified current connected to the welding operation at workpiece 16 and electrode 18 through resistors 150, 152, corresponding to resistors 54 and 56 in FIGS. 1 and 2. These resistors control the background current and voltage available to the welding output. For a common TIG welder having an open circuit voltage of about 70–80 volts and an operating voltage in the neighborhood of 13–16 volts, it has been found that the resistance of background current circuit 100 (resistors 150, 152) is generally in the range of 20–30 ohms, and preferably about 24–25 ohms to provide a welding operation of about 2 amperes at 13 volts. Thus, for a common welder, resistors 150, 152 (54, 56) have a combined resistance in the general range of 20–30 amperes. The total resistance can be divided between the inlet and outlet resistors; however, each SCR has a resistor and diode in parallel. The resistor limits current in the parallel circuit. The current waveforms associated with this preferred embodiment are illustrated in graphs of FIGS. 4 and 5. In FIG. 4, the graph in dashed lines is the secondary AC voltage 200 having a positive half cycle 202 and a negative half cycle 204. Gating pulses 210, 212 initiate the respective gated switches to cause voltage spikes 220, 222 from the AC input. These current spikes cause current pulses 230, 232 through DC choke 12 as shown in FIG. 5. When connecting bridge 30 for AC operation, choke 12 is connected across the DC terminal of the gated bridge. The graph in FIG. 4 is illustrative of low current operation for welder A. A low current welding background current fills the gaps between SCR current spikes 220, 222 and is shown as current 240 in FIG. 5. FIG. 5 represents DC operation of bridge 30; therefore, current pulses 230, 232 have been rectified and are in the positive direction. Current 240 from circuit 100 is controlled by the resistance level of resistors 150, 152 (54, 56). Background current 242 occurs during the positive half cycle while background current 244 occurs during the negative half cycle. When gating signals 210, 212 are created for low current operation, resistors 150, 152 are shunted. The shunted portion of the background current illustrated as portions 250, 252, 254 and 256. When there is an open circuit, the bridge is full on and the diode and resistors of circuit 100 are bypassed. The present invention is illustrated in FIG. 5 as used for a DC welding operation.

Figure 7:
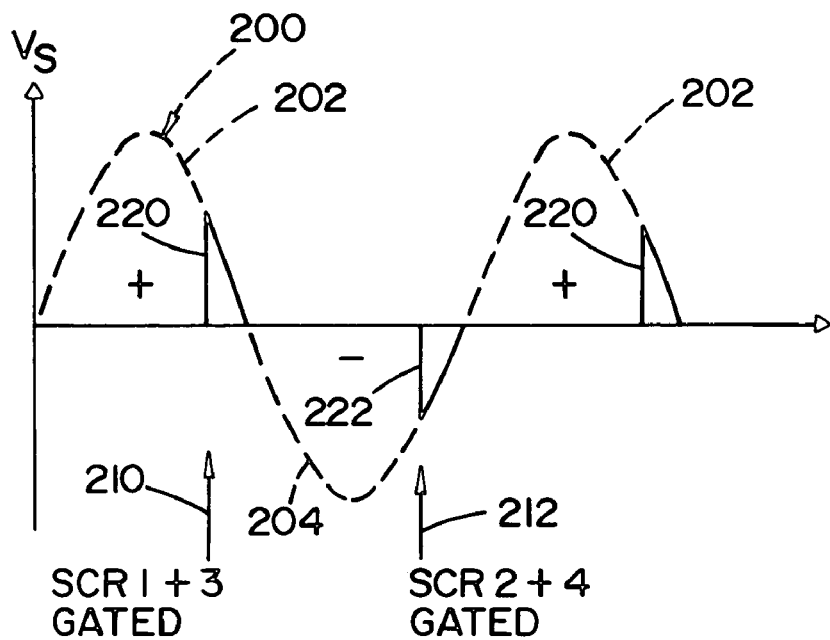
FIG. 7 is a secondary voltage graph as in FIG. 4 showing voltage pulses created by the power source of the present invention.
Figure 8:
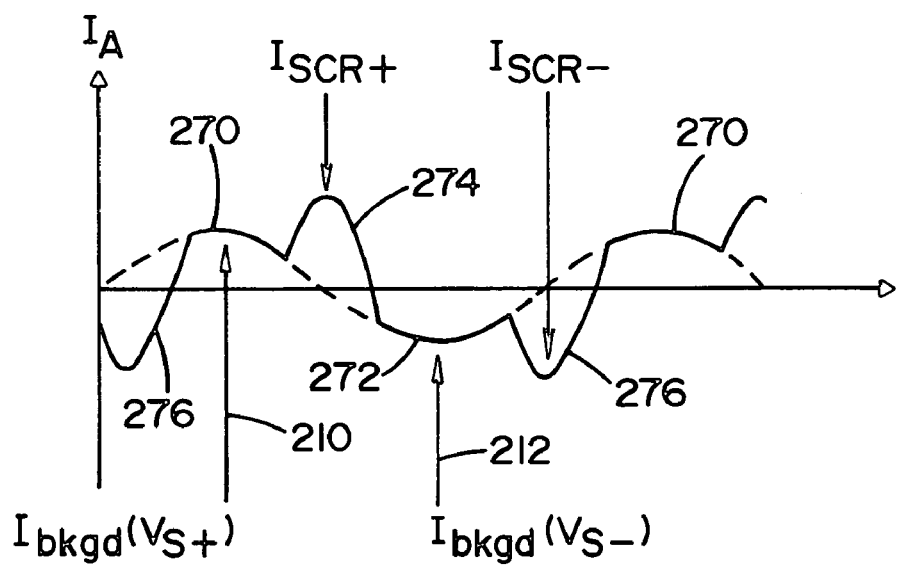
FIG. 8 is a graph similar to the graph of FIG. 5 when AC welding.

FIG. 6 illustrates welder A' connected for AC welding with switch 42 opened and switch 42a closed to connect DC choke 12 between DC terminals 32, 34. Like components have the same numbers as used in FIG. 3. Secondary 52 is connected through electrode 18 and workpiece 16 in parallel with rectifier 110 through resistors 150, 152. The waveform 200 of welder A' is shown in FIG. 7 with the same number as in FIG. 4 since bridge 30 operates the same in both DC and AC welding. The AC waveform shown in FIG. 8 has positive portions 274 and negative portion 276 with background current 270, 272 between pulses of the SCR bridge. Again, the background current is automatically created when the SCR in parallel with a diode and resistor is not conducting. This fills the gaps between pulses, which gaps are large at low currents, such as welding current of less than 5.0 amperes. Low current is generally considered less than 8.0 amperes. In practice the current is preferably 5.0 amperes or less.

Figure 9:
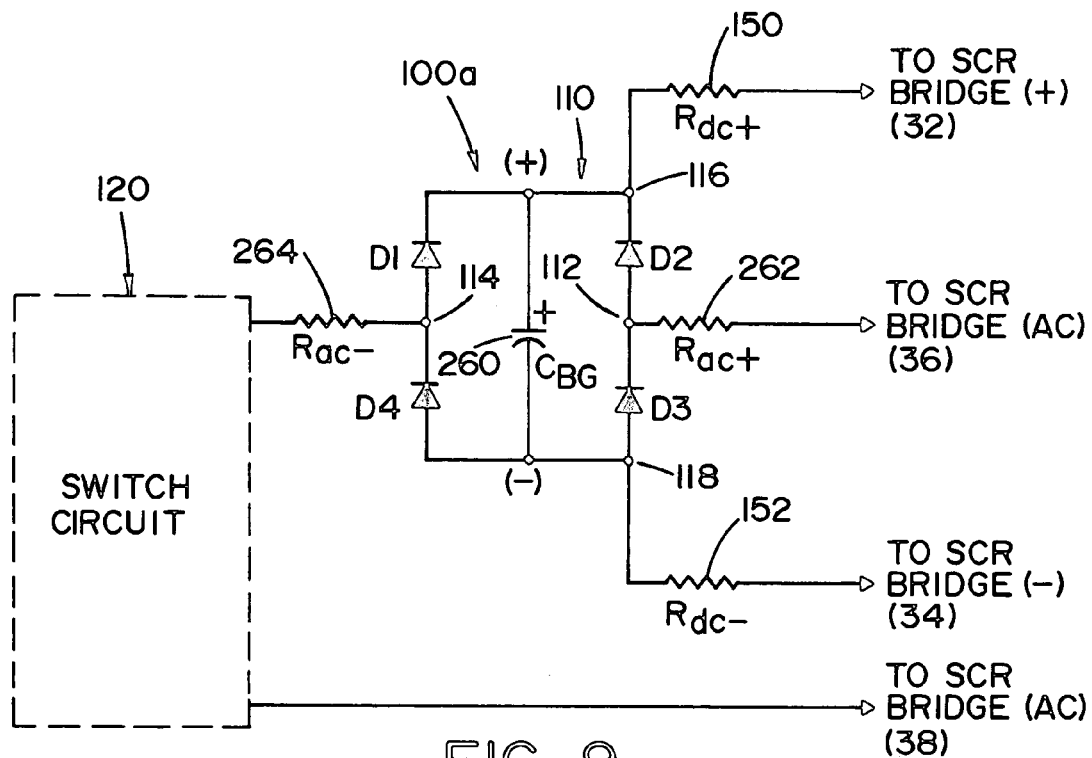
FIG. 9 is a wiring diagram illustrating a modification of the present invention.
Figure 10:
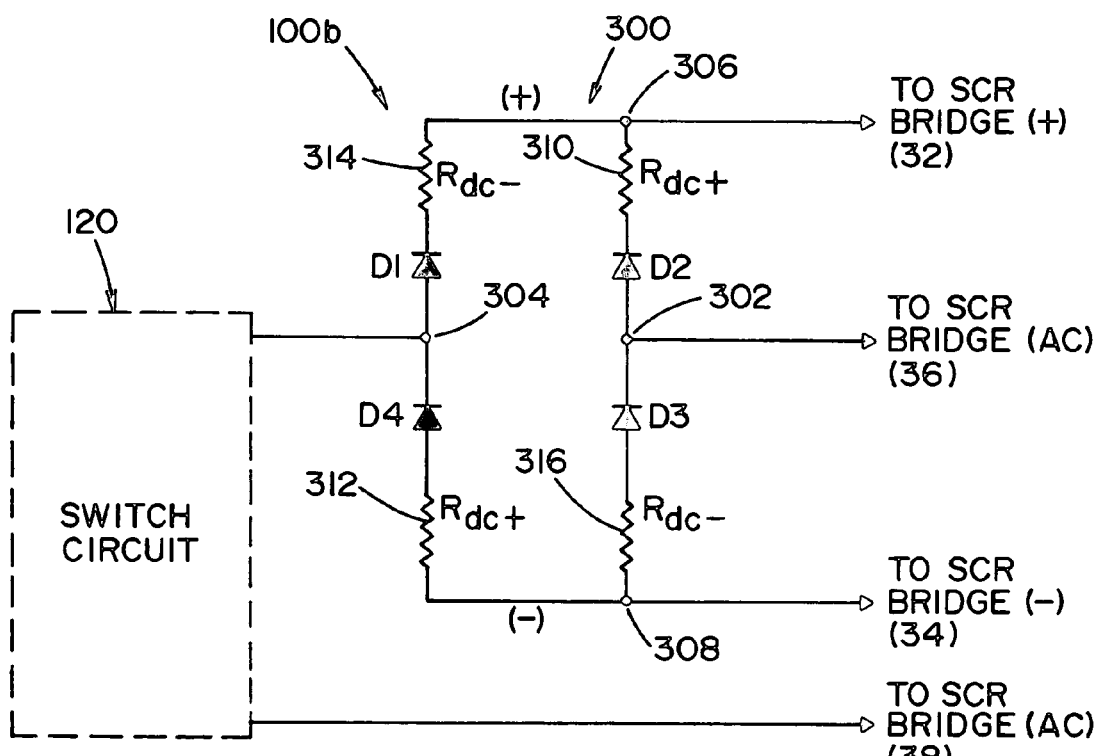
FIG. 10 is a wiring diagram showing still a further modification of the preferred embodiment of the present invention.
Figure 11:
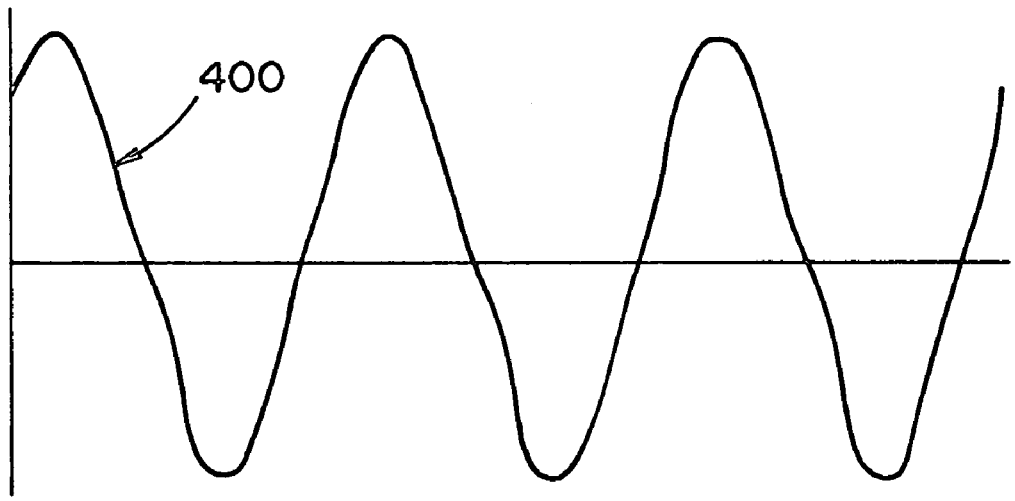
FIG. 11 is a voltage graph of OCV when using the modification of FIG. 9.
Figure 12:
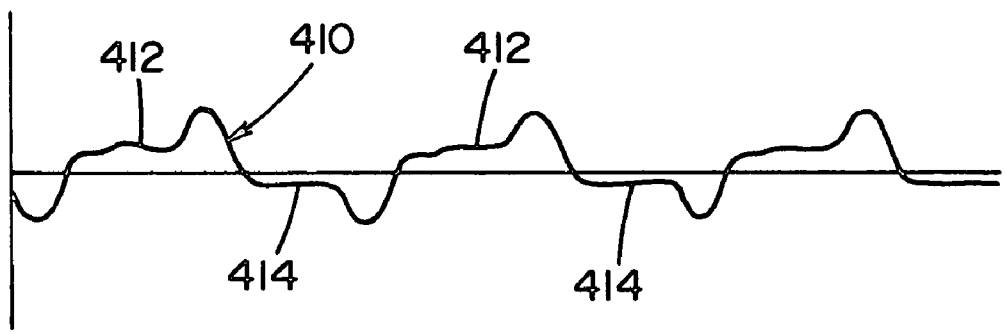
FIG. 12 is a current graph showing low current cleaning with the circuit of FIG. 9.

A modified background current circuit 100a is illustrated in FIG. 9 where rectifier 110 has a filter capacitor 260 where a portion of the 10–15 ohms resistance, such as about 2 ohms in the AC path of the rectifier has resistors 262, 264. These resistors limit inrush of current to capacitor 260. The filter capacitor results in continuous DC background current wave shape that essentially fills in the valley between the positive and negative current portions 242, 244, as shown in FIG. 5. This flattens the background current and allows still lower current welding. By using this filter concept, the current remains in existence without a fill-in by successive SCR spikes. Another modified background current circuit 100b is shown in FIG. 10. This circuit allows low current cleaning or penetration during AC operation of the background current circuit. Rectifier 300 has DC resistors 310, 312 during the positive half cycle and 314, 316 during the negative half cycle. By adjusting the total resistance of resistors 310, 312 with respect to resistors 314, 316, the current during the positive and negative half cycles has different magnitudes. During AC operation, these magnitudes are different directions to allow more cleaning or penetration of the workpiece even during low current operation when essentially the background current is doing the welding. The results of using the imbalance background current by the circuit of FIG. 10 are shown in FIGS. 11 and 12. In FIG. 11, the welder is open circuit (no arc); consequently, bridge 30 is full on and circuit 100b is shunted and AC current 400 is not distorted to any great extent. At low welding currents, as shown in FIG. 12, the AC current 410 has positive pulses 412 with higher background current and negative pulses 414 with lower background current. This allows cleaning even at very low current. By reversing the levels of resistors used, higher negative background current with lower positive background current can be obtained for low current penetration effect. This is not allowed in prior units.

Having thus defined the invention, the following is claimed:

1. An electric arc welder comprising a gated bridge driven by the secondary of an input transformer with an output connected across the electrode and workpiece of a welding operation through a DC choke and a background current circuit including a full-wave rectifier with an AC input and a rectified DC output, current control background resistance and filter network, said background current circuit connected in series with said welding operation and said DC choke, wherein said input of said full wave rectifier is connected in parallel with said secondary winding driving said gated bridge.

2. An electric arc welder as defined in claim 1 wherein said gated bridge includes alternately gated SCRs.

3. An electric arc welder as defined in claim 2 wherein said gated bridge is parallel with said welding operation to perform DC welding.

4. An electric arc welder as defined in claim 2 wherein said gated bridge is in series with said welding operations to perform AC welding.

5. An electric arc welder as defined in claim 2 wherein said gated bridge includes a first set of gated switches operated during a first polarity for a first given portion of such first polarity and a second set of gated switches operated during a polarity opposite to said first polarity for a second given portion of said opposite polarity.

6. An electric arc welder as defined in claim 2 wherein said background current resistance is in the range of about 20–30 ohms.

7. An electric arc welder as defined in claim 2 wherein said resistance is the sum of the resistance of resistors at the input of said full wave rectifier and resistors at the output of said full wave rectifier.

8. An electric arc welder as defined in claim 7 wherein input and output resistors have substantially the same ohm value.

9. An electric arc welder as defined in claim 1 wherein said gated bridge is parallel with said welding operation to perform DC welding.

10. An electric arc welder as defined in claim 9 wherein said gated bridge includes a first set of gated switches operated during a first polarity for a first given portion of such first polarity and a second set of gated switches operated during a polarity opposite to said first polarity for a second given portion of said opposite polarity.

11. An electric arc welder as defined in claim 9 wherein said background current resistance is in the range of about 20–30 ohms.

12. An electric arc welder as defined in claim 9 wherein said resistance is the sum of the resistance of resistors at the input of said full wave rectifier and resistors at the output of said full wave rectifier.

13. An electric arc welder as defined in claim 12 wherein input and output resistors have substantially the same ohm value.

14. An electric arc welder as defined in claim 1 wherein said gated bridge is in series with said welding operations to perform AC welding.

15. An electric arc welder as defined in claim 14 wherein said gated bridge includes a first set of gated switches operated during a first polarity for a first given portion of such first polarity and a second set of gated switches operated during a polarity opposite to said first polarity for a second given portion of said opposite polarity.

16. An electric arc welder as defined in claim 14 wherein said background current resistance is in the range of about 20–30 ohms.

17. An electric arc welder as defined in claim 14 wherein said resistance is the sum of the resistance of resistors at the input of said full wave rectifier and resistors at the output of said full wave rectifier.

18. An electric arc welder as defined in claim 17 wherein input and output resistors have substantially the same ohm value.

19. An electric arc welder as defined in claim 1 wherein said gated bridge includes a first set of gated switches operated during a first polarity for a first given portion of such first polarity and a second set of gated switches operated during a polarity opposite to said first polarity for a second given portion of said opposite polarity.

20. An electric arc welder as defined in claim 1 wherein said background current resistance is in the range of about 20–40 ohms.

21. An electric arc welder as defined in claim 20 wherein said resistance is the sum of the resistance of resistors at the input of said full wave rectifier and resistors at the output of said full wave rectifier.

22. An electric arc welder as defined in claim 21 wherein input and output resistors have substantially the same ohm value.

23. An electric arc welder as defined in claim 1 wherein said resistance is the sum of the resistance of resistors at the input of said full wave rectifier and resistors at the output of said full wave rectifier.

24. An electric arc welder as defined in claim 23 wherein input and output resistors have substantially the same ohm value.

25. An electric arc welder as defined in claim 1 wherein the filter network further includes a capacitance and a current inrush limiting resistance.

26. An electric arc welder as defined in claim 1 wherein the background resistance is comprised of positive half cycle resistance and negative half cycle resistance, the positive half cycle resistance and negative half cycle resistance having different ohm values.

27. An electric arc welder comprising a power source driven by a main input transformer with a secondary winding creating an output pulsating current across the electrode and workpiece of a welding operation and a background current circuit including a full-wave rectifier with AC input and a rectified DC output connected in parallel with said power source and a background current resistance in a range of 20–30 ohms.

28. An electric arc welder as defined in claim 27 wherein said resistance is the sum of the resistance of resistors at the input of said full wave rectifier and resistors at the output of said full-wave rectifier.

29. An electric arc welder as defined in claim 28 wherein input and output resistors have substantially the same ohm value.

30. An electric arc welder as defined in claim 27 wherein said background resistance is the sum of the resistance of resistors at the input of said full wave rectifier and resistors at the output of said full-wave rectifier.

31. An electric arc welder as defined in claim 30 wherein input and output resistors have substantially the same ohm value.

32. An electric arc welder as defined in claim 27 wherein the background current circuit further includes a filter network, configured to generate a continuous DC background current wave shape by the background current circuit.

33. An electric arc welder as defined in claim 27 wherein the background resistance is comprised of positive half cycle resistance and negative half cycle resistance, the positive half cycle resistance and negative half cycle resistance having different ohm values.

34. An electric arc welder comprising a full-wave gated bridge driven by the secondary of an input transformer with an output connected across the electrode and workpiece of a welding operation and a background current circuit including a full-wave rectifier with an AC input and a rectified DC output, a current control background resistance and a filter network, said background current circuit connected in series with said welding operation, wherein said input of said full wave rectifier is connected in parallel with said secondary winding driving said gated bridge.

35. An electric arc welder as defined in claim 34 wherein said gated bridge includes alternately gated SCRs.

36. An electric arc welder as defined in claim 35 wherein said gated bridge is parallel with said welding operation to perform DC welding.

37. An electric arc welder as defined in claim 35 wherein said gated bridge is in series with said welding operations to perform AC welding.

38. An electric arc welder as defined in claim 34 wherein said gated bridge is parallel with said welding operation to perform DC welding.

39. An electric arc welder as defined in claim 34 wherein said gated bridge is in series with said welding operations to perform AC welding.

40. An electric arc welder as defined in claim 34 wherein the filter network further includes a capacitance and a current inrush limiting resistance.

41. An electric arc welder as defined in claim 34 wherein the background resistance is comprised of positive half cycle resistance and negative half cycle resistance, the positive half cycle resistance and negative half cycle resistance having different ohm values.

42. An electric arc welder comprising a gated full-wave bridge, two pairs of reverse polarity switches and driven by the secondary of an input transformer with an output connected across the electrode and workpiece of a welding operation and a background current circuit comprising a diode and a resistor in parallel with each switch in said bridge, and a background resistance comprised of a positive half cycle resistance and a negative half cycle resistance, the positive half cycle resistance and negative half cycle resistance having different ohm values.

43. An electric arc welder as defined in claim 42 wherein said gated bridge is in series with said welding operations to perform AC welding.

44. An electric arc welder as defined in claim 43 wherein said diodes are connected in a full wave rectifier and said resistors are an input resistor from said rectifier to said bridge and an output resistor from said bridge to said rectifier.

45. An electric arc welder as defined in claim 42 wherein said diodes are connected in a full wave rectifier and said resistors are an input resistor from said rectifier to said bridge and an output resistor from said bridge to said rectifier.

46. An electric arc welder as defined in claim 42 wherein the background current circuit further includes a filter network, configured to generate a continuous DC background current wave shape.

47. An electric arc welder as defined in claim 42 wherein the filter network further includes a capacitance and a current inrush limiting resistance.

* * * * *